(12) United States Patent
Sasian et al.

(10) Patent No.: US 7,751,034 B2
(45) Date of Patent: Jul. 6, 2010

(54) SYSTEMS AND METHODS FOR RAY TRACING

(75) Inventors: Jose Sasian, Tuscon, AZ (US); Jason Quick, Las Vegas, NV (US); Jason Flatt, Las Vegas, NV (US)

(73) Assignee: American Gem Society, Las Vegas, NV (US)

( * ) Notice: Subject to any disclaimer, the term of this patent is extended or adjusted under 35 U.S.C. 154(b) by 890 days.

(21) Appl. No.: 11/564,048

(22) Filed: Nov. 28, 2006

(65) Prior Publication Data

US 2008/0123076 A1 May 29, 2008

(51) Int. Cl.
*G01N 21/00* (2006.01)
(52) U.S. Cl. ............................................ 356/30; 703/2
(58) Field of Classification Search .................. 356/30; 702/35; 703/2
See application file for complete search history.

(56) References Cited

U.S. PATENT DOCUMENTS

| | | | |
|---|---|---|---|
| 4,647,194 A | 3/1987 | Shigetomi et al. | |
| 5,118,181 A | 6/1992 | Yifrach et al. | |
| 5,164,586 A | 11/1992 | Hohberg et al. | |
| 5,196,966 A | 3/1993 | Yamashita | |
| 5,260,763 A | 11/1993 | Yamashita | |
| 5,430,538 A | 7/1995 | Kobayashi | |
| 5,615,005 A | 3/1997 | Valente et al. | |
| 5,627,638 A | 5/1997 | Vokhmin | |
| 5,966,673 A * | 10/1999 | Shannon, Sr. ................ | 702/35 |
| 6,020,954 A | 2/2000 | Aggarwal | |
| 6,128,577 A | 10/2000 | Assa et al. | |
| 6,239,867 B1 | 5/2001 | Aggarwal | |
| 6,348,964 B1 | 2/2002 | Wagner et al. | |
| 6,567,156 B1 | 5/2003 | Kerner | |
| 6,665,058 B1 | 12/2003 | Gilbertson | |
| 6,795,171 B1 | 9/2004 | Gilbertson | |
| 6,980,283 B1 | 12/2005 | Aggarwal | |
| 7,136,154 B2 | 11/2006 | Bray | |
| 7,193,694 B2 | 3/2007 | Underwood | |
| 7,355,683 B2 * | 4/2008 | Sasian et al. ................ | 356/30 |

(Continued)

OTHER PUBLICATIONS

"Software Plots Diamonds, Helps Identify Gems," Jewelers' Circular-Keystone, Oct. 1994.

(Continued)

*Primary Examiner*—Kara E Geisel
(74) *Attorney, Agent, or Firm*—Lewis, Rice & Fingerish, L.C.

(57) ABSTRACT

Systems and methods for evaluating an optical property of a gemstone operate to trace selected and ordered model light rays through a model of the gemstone. The rays may be selected such that, when ordered into a sequence, the points of contact of successive rays with the gemstone surface generate a pattern defined by a path created by the linking of successive contact points with line segments. Further, the rays may be propagated through the gemstone in a manner that utilizes an ordered set of facet identifiers corresponding to facets impinged upon by a ray previously propagated through the gemstone. Moreover, these strategies can be combined by propagating an ordered sequence of rays corresponding to an ordered set of contact points generating a pattern defined by a path, and using for such propagation an ordered set of facet identifiers corresponding to facets impinged upon by a ray previously propagated through the gemstone.

22 Claims, 7 Drawing Sheets

U.S. PATENT DOCUMENTS

| | | | |
|---|---|---|---|
| 2002/0052170 | A1 | 5/2002 | Holloway |
| 2004/0246464 | A1* | 12/2004 | Sivovolenko .................. 356/30 |
| 2005/0190356 | A1 | 9/2005 | Sasian et al. |
| 2005/0190357 | A1 | 9/2005 | Sasian et al. |
| 2005/0200834 | A1 | 9/2005 | Sasian et al. |
| 2005/0213077 | A1 | 9/2005 | Sasian et al. |
| 2006/0074588 | A1* | 4/2006 | Blodgett et al. ............. 702/179 |
| 2006/0164623 | A1 | 7/2006 | Wagner et al. |
| 2006/0190292 | A1 | 8/2006 | Reinitz et al. |
| 2006/0267975 | A1 | 11/2006 | Moses et al. |

OTHER PUBLICATIONS

Sivovolenko, S.B., Shelementyev, Y.B. and Holloway, G., "On grading the symmetry of a round brilliant cut diamond," Dec. 19, 2005, http://www.gemology.ru.cut/english/symmetry/_index.htm.

Solotaroff, I., "Making the Grade," Modern Jeweler Magazine, Jun. 2005.

Yantzer, P., Caudill, J. and Flora, D., "New AGS Cut Grading System," Rapaport Diamond Report, Jun. 3, 2005.

"The AGS Aset: A Real World View of the Light-Handling Capabilities of a Faceted Diamond," http://www.kassoy.com/gemology/aset01.html, printed on Sep. 14, 2005.

Yantzer, P., Caudill, J. and Flora, D., "New AGS Cut Grading System," http://www.rapaport.com/news/newsitem.asp?num=12383&type=all&topic-all&searchfor..., printed on Sep. 14, 2005.

"New Arrivals: Tools, Products and Services," www.instoremag.com, Sep. 2005.

"What Is the Ideal-Scope and What Does It Do?", http://www.pricescope.com/idealscope_indx.asp, printed May 30, 2006.

"Russian Diamond Cut Studies, Diamond Calculator and Gem Adviser," http://www.pricescope.com/MSU/default.asp, printed May 30, 2006.

"Diamond Calculator: Description", http://www.pricescope.com/MSU/diamcalc.asp, printed May 30, 2006.

Green, B., Johnson, M., Reinitz, I. and Shigley, J., "Diamond Appearance: The Components of a Computer Model," GIA Research, http://www.gia.edu/research/1383/431/article_detail.cfm, printed May 31, 2006.

Buck, J., "The Recursive Ray Tracing Algorithm," http://www.geocities.com/jamisbuck/raytracing.html?200631, printed May 31, 2006.

"Diamond Cut Study: Proposed Three Dimensional Modeling Method," http://www.gemology.ru.cut/english/conferensarticle/_2.htm, printed May 30, 2006.

"Diamond Grading," Sarin Technologies Ltd., http://www.sarin.com/diamond.asp, printed May 30, 2006.

Sasian, J., Yantzer, P., and Tivol, T., "The Optical Design of Gemstones," Optics and Photonics News, Apr. 2003.

Bates, B., "Cut From the Same Cloth," JCK-Jewelers Circular Keystone Magazine, Jun. 2003.

"A JCK Exclusive: AGS and Eightstar sign research and development agreement," JCK-Jewelers Circular Keystone, http://www.jckgroup.com/index.asp?layout=articlePrint&articleID=CA227219&webzine=jck&p..., printed on Jun. 19, 2003.

Reinitz, I, Johnson, M. and Gilbertson, A., "Comments on the GIA Analysis of Diamond 'Fire,'" Letters, Gems & Gemology, Summer 2002.

* cited by examiner

SYSTEMS AND METHODS FOR RAY TRACING

BACKGROUND

1. Field of the Invention

This disclosure relates to systems and methods for modeling the optical effects caused by the interaction of light with three-dimensional objects, and more particularly, relates to systems and methods for ray-tracing and modeling such effects in a gemstone in order to determine the appearance of a gemstone for use in gemstone evaluation and grading.

2. Description of the Related Art

Diamonds have traditionally been graded based on what is known as the four C's: color, clarity, carat weight, and cut. Other than carat weight which is related to the actual volume (size) of the gemstone, the other three factors attempt to quantify or rank diamonds which are objectively "better" than others. Color refers to the intrinsic color a given diamond appears to be, clarity refers to the purity of the gem when material inclusions or defects are considered, and cut refers to the geometry of the cut. These grading factors are taken into consideration when appraising a gem and therefore the subject of grading is important to the gemstone industry.

While the four C's have a long standing tradition, there are other attributes that are important in grading gemstones. For example, some appraisers will focus on what they see in a diamond such as the "liveliness". A well cut diamond, when moved, will often appear to include many different colors of light in a number of different locations making the gemstone to have what appears to be a large amount of internal movement, color, and prismatic effect.

Generally, a diamond's effect on light is characterized by referring to the gemstone as having fire, brilliance, or scintillation. All of these terms relate to the gemstone's ability to reflect, refract, and otherwise act on incoming light in a particular fashion. Brilliance is the gemstone's ability to direct white light toward a viewer, scintillation, is the apparent movement or flashing of light in the gemstone, and fire is generally the ability of the gemstone to disperse light and produce specific colors which appear to be within the gemstone.

Interestingly, the illumination conditions impact the ability to see the illumination effects of fire, brilliance, and scintillation. For instance, a very brilliant diamond may appear not to have much fire. While color may be being produced and the gemstone does have a high level of dispersion, the color may be washed out by the high level of reflected white light. Therefore, it often requires examination of a gemstone under many different lighting conditions to see its true abilities.

Because of the complexity of a diamond's geometry as well as the different kind of environments in which it may be viewed, purchasing diamonds is difficult on the consumer. A consumer may look at a diamond and think it is attractive, but a concern might be that this attractiveness is not objectively "better" and that the gem could be overpriced. For this reason, an ability to objectively evaluate gems and to more systematically explain the benefits of a particular diamond is desirable.

Gemstone complexity has led to the development of systems, methods, and apparatus, which can evaluate the characteristics of light passing through a diamond using computer modeling. Generally, the computer will trace the paths of a large number of hypothetical light rays through a representation (a skin or model) of the gemstone utilizing ray tracing algorithms. This tracing relies on mathematic and physical rules to evaluate what a user will see when the gemstone is exposed to general environmental light. Ray tracing is performed by company proprietary software or with commercially available optical design programs such as ASAP™ (available from Breault Research Organization, Tucson, Ariz.), FRED (available from Photon Engineering, Tucson, Ariz.), LightTools® (available from Optical Research Associates, Pasadena, Calif.), TRACEPRO® (available from Lambda Research, Littleton, Mass.) or ZEMAX® (available from ZEMAX Development Corporation, San Diego, Calif.)

Some of these systems and methods are shown in U.S. patent application Ser. Nos. 11/018,042, 11/018,743, 11/018,742, 11/018,744, and 11/388,384, the entire disclosures of which are herein incorporated by reference. These Applications provide for a number of systems, methods, and apparatuses which utilize ray tracing to evaluate diamonds and other gemstones. These applications generally provide for systems, methods, and apparatus that utilize ray tracing through a three-dimensional map (or skin) of a diamond. The ray tracing will generally be performed by a computer or other processor which will trace a large number of rays through the gemstone and provide a map or other visualization which graphically shows how light rays of various different wavelengths interact with the gemstone's shape. The systems methods and apparatus may also provide for numerical indicators of a particular diamond's ability to provide a particular optical feature.

In the end, these systems, methods, and apparatus are designed to provide an output which allows for information about the gemstones quantifiable optical properties to be provided to a purchaser in an easily understandable fashion. Often this information is provided in the form of a "map" which shows the table or crown of the gemstone and is color coded to show how particular areas provide particular optical effects.

The map, however, is generated by utilizing a large number of point sources and ray traces which are incident on the gemstone. Sufficient rays must be used to either fill the gemstone to the point where the resultant pattern is clear, or to provide sufficient points to accurately presume what unmapped points would be. In some embodiments of evaluation programs, the number of rays traced can be relatively large (e.g. about 100,000 or more, about 500,000 or more, about 1,000,000 or more). This is generally the case in embodiments where one or more maps or drawings of properties of the diamond are to be generated. In these cases, a sufficiently large number of rays to fill an image, or allow what is considered accurate estimating, should be used. In some other embodiments, fewer rays can be traced (e.g., about 50,000 or less, about 20,000 or less, such as about 5,000). For example, when calculating only a single property from a more symmetrical diamond, about 5,000 to about 50,000 rays can provide sufficiently accurate results.

Even tracing a relatively small number of rays, e.g., 50,000, however, can still take an enormous amount of time in the aggregate, especially since traditional ray tracing algorithms generally utilize inefficient search techniques which rely on the speed of the computer or processor to provide for a result in a reasonable time (as even a computer using an inefficient methodology may be much faster than a human using an efficient methodology), A computer utilizing such an algorithm may take several minutes to complete the desired analysis. When the process is to be performed on thousands of diamonds and for multiple aspects of each diamond, this processing time quickly adds up, and can make the system sufficiently inefficient to not be practicable.

One patented method attempts to deal with this computational intensity by decreasing the computations involved in the analysis. Instead of ray tracing, U.S. Pat. No. 5,966,673 describes a method that models the propagation through a gemstone of a three-dimensional light beam. Because a beam has a definite cross-sectional area, this method covers more of the gemstone surface with each beam propagation than does any single ray propagation. In ray tracing of gemstones, however, the value and accuracy, as well as the different types of information that can be provided, is often increased by simply increasing the number of rays that are traced. Therefore, it is often preferable to model the propagation of a large number of rays. Thus, too, it is often preferable to utilize a more efficient ray propagation method.

SUMMARY

In light of the computational intensity of ray tracing, the present disclosure provides new approaches thereto, specifically with respect to the modeling of the optical properties of gemstones. Primarily, two modeling approaches are discussed herein. The first approach is to generate model light rays that impinge on the surface of the gemstone at contact points that are arrayed in a predetermined pattern covering some portion of the surface of the gemstone. In a preferred embodiment, successively analyzed model rays differ in that either or both of the ray direction and its point of contact with the gemstone are altered by a relatively small magnitude compared to the same parameters of the previously generated model ray. In another preferred embodiment utilizing this first approach, successively analyzed rays have gemstone contact points arranged in a pattern such that the path formed by line segments connecting successive contact points forms a spiral on the surface of the gemstone.

The second modeling approach discussed herein is one in which the path determined for a first ray is used as an approximation for the path of the next successively generated ray, the later of which has one or both of its direction and contact point altered compared to the first ray. In an embodiment, the path approximation is effected by assuming successive rays will impinge upon the same facets of the gemstone in the same order during propagation through the gemstone. In an embodiment, such a ray path approximation is substantially accurate, and thereby computation of the path of the later, successively generated ray is facilitated. In a preferred embodiment both the first (contact point pattern) and second (path approximation) approaches are utilized in concert in the ray tracing process.

In an embodiment, a method useful in evaluating an optical property of a gemstone comprises the steps of generating a model gemstone comprising a plurality of facets, each facet being identified by a facet identifier; providing a pattern of successive contact points on the surface or crown of the gemstone, the pattern being such that the connection of successive contact points with a line generates an expanding rotational path; selecting a model light ray, the ray having an initial location and direction such that the ray impinges upon a contact point comprised by the pattern that is either the same as or successive to a contact point impinged upon by a ray propagated immediately prior to propagation of the selected ray; providing a first path set comprising an ordered sequence of at least one facet identifier, the first path set corresponding in whole or in part to a sequence of facets impinged upon by a ray propagated through the gemstone prior to propagation of the selected ray through the gemstone; propagating the selected ray through the gemstone utilizing the first path set as a source for identifying a predicted facet of impingement for the selected ray; creating a subsequent ordered path set comprising at least one facet identifier corresponding to a facet impinged upon by the selected ray during propagation through the gemstone, the correspondence being such that the position of the at least one facet identifier within the subsequent ordered path set is the same as the position of the facet identified by the at least one facet identifier within the sequence of facets impinged by the selected ray during propagation thereof through the gemstone; repeating the steps of selecting a model light ray, providing a path set, propagating the selected ray, and creating a subsequent ordered path set; determining at least one optical property of the gemstone based on an analysis of the selected rays. Such a method may further comprise the step of determining an alteration to the gemstone that would improve an optical property of the gemstone.

An embodiment of the invention is a computer program product comprising a set of instructions residing on computer-readable medium and capable of being followed by a computer processor, the instructions comprising: instruction means for providing a pattern of successive contact points on the surface of a model gemstone, the pattern being such that the connection of successive contact points with a line generates an expanding rotational path; instruction means for selecting a model light ray, the ray having an initial location and direction such that the ray impinges upon a contact point comprised by the pattern that is either the same as or successive to a contact point impinged upon by a ray propagated immediately prior to propagation of the selected ray; instruction means for providing a first path set comprising an ordered sequence of at least one facet identifier, the first path set corresponding in whole or in part to a sequence of facets impinged upon by a ray propagated through the gemstone prior to propagation of the selected ray through the gemstone; instruction means for propagating the selected ray through the gemstone utilizing the first path set as a source for identifying a predicted facet of impingement for the selected ray; instruction means for creating a subsequent ordered path set comprising at least one facet identifier corresponding to a facet impinged upon by the selected ray during propagation through the gemstone, the correspondence being such that the position of the at least one facet identifier within the subsequent ordered path set is the same as the position of the facet identified by the at least one facet identifier within the sequence of facets impinged by the selected ray during propagation thereof through the gemstone; instruction means for repeating the instruction means for selecting a model light ray, instruction means for providing a path set, instruction means for propagating the selected ray, and instruction means for creating a subsequent ordered path set; instruction means for determining at least one optical property of the gemstone based on an analysis of the selected rays.

In an alternate embodiment, a method useful in evaluating an optical property of a gemstone comprises the steps of: generating a model gemstone comprising a plurality of facets, each facet being identified by a facet identifier; selecting a model light ray for propagation through the gemstone; providing a first path set comprising an ordered sequence of at least one facet identifier, the first path set corresponding in whole or in part to a sequence of facets impinged upon by a ray propagated through the gemstone prior to propagation of the selected ray through the gemstone; propagating the selected ray through the gemstone utilizing the first path set as a source for identifying a predicted facet of impingement for the selected ray, creating a subsequent ordered path set comprising at least one facet identifier corresponding to a facet impinged upon by the selected ray during propagation through the gemstone, the correspondence being such that the position of the facet identifier within the subsequent ordered path set is the same as the position of the facet identified by the facet identifier within the sequence of facets impinged by the selected ray during propagation thereof through the gemstone; repeating the steps of selecting a model light ray, providing a path set, propagating the selected ray, and creating a subsequent ordered path set; determining at least one optical property of the gemstone based on an analysis of the selected rays.

In alternative embodiments of this method the selected ray is modeled as comprising light having either only one or more than one frequency within the visible light spectrum; the propagation of the selected ray is performed either in quasi-parallel fashion or in series with the propagation of the ray previously propagated; the subsequent ordered path set comprises facet identifiers for each facet impinged upon by the selected ray during propagation thereof; the first path set comprises facet identifiers for each facet impinged upon by the ray propagated through the gemstone prior to propagation of the selected ray through the gemstone.

An alternate embodiment of this method further comprises the step of providing a ray set consisting of rays to be propagated during an evaluation of the gemstone; wherein the step of selecting is limited to selecting a ray from the ray set; and wherein the step of repeating is performed until each of the rays in the ray set has been propagated. In an embodiment of this method, during the step of propagating, the predicted facet of impingement is identified by a facet identifier occupying a position within the first path set that is the same as the position within the subsequent ordered path set that will be occupied by a facet identifier identifying a facet impinged by the selected ray for which the predicted facet of impingement is used as a prediction. In a still further alternate embodiment this method further comprising the step of determining whether the selected ray impinges upon the predicted facet of impingement.

Another embodiment is a method further comprising the steps of: choosing one or more next predicted facets of impingement, the next predicted facets of impingement being spatially adjacent to the predicted facet of impingement; resolving whether the selected ray impinges upon any of the one or more next predicted facets of impingement; and repeating the steps of choosing and resolving, unless and until a facet of impingement has been determined; wherein the steps of choosing, resolving, and repeating the steps of choosing and resolving are performed only if the selected ray is determined not to impinge upon the predicted facet of impingement.

An alternate embodiment is a method useful in evaluating an optical property of a gemstone comprising the steps of: generating a model gemstone; providing a pattern of successive contact points on the surface of the gemstone, the pattern being such that the connection of successive contact points with a line generates an expanding rotational path; selecting a set of model light rays, each ray in the set having an initial location and direction such that the ray initially impinges upon a contact point comprised by the pattern of contact points; ordering the rays within the set of rays in a sequence such that successive rays in the sequence impinge upon a contact point that is either the same as or successive to a contact point impinged upon by a ray immediately prior thereto in the sequence; propagating the rays through the gemstone using the sequence as a basis for an order of propagation; determining at least one optical property of the gemstone based on an analysis of the rays.

In alternate embodiment of this method, the path defining the pattern generally fits to the shape of a spiral, a distorted spiral, a square spiral, a rectangular spiral, a triangular spiral, an oval spiral, a pear spiral, or a heart spiral, or generally fits to the shape of the projection onto the gemstone of a spiral, a distorted spiral, a square spiral, a rectangular spiral, a triangular spiral, an oval spiral, a pear spiral, or a heart spiral; the path has a base shape corresponding to the shape of the gemstone at the largest horizontal circumference thereof, the contact points defining the pattern are generally evenly distributed about at least a portion of the surface area of the gemstone; the portion of the surface of the gemstone is one of the whole surface, a segment, a table, a bezel, a crown, a girdle, a pavilion, a culet, a facet, or a projection onto the surface of the gemstone of a geometric shape; propagation of a ray is performed either in quasi-parallel fashion or in series with propagation of a successive ray within the sequence; or the step of propagating is performed based on a predicted path of propagation for each ray so propagated.

DESCRIPTION OF PREFERRED
EMBODIMENT(S)

As ray tracing is a computational modeling methodology, it shall be understood that, as discussed herein, light rays, gemstones and portions thereof are generally presented as mathematical models used to analyze real-world counterparts, whether such real-world counterparts actually exist or not. Unless otherwise specifically noted references to rays and gemstones or portions thereof are references to mathematical models for such real-world counterparts. Even when such models do not have actual counterparts in the real world at the time the model is created and used (such as when a model is made of a hypothetical gemstone), the results of the modeling process are useful for such purposes as the design and cutting of actual, real-world gemstones, or the improvement thereof.

A computational ray tracing algorithm will generally operate on a mathematical model of a gemstone. The gemstone model generally includes data defining the size and shape of each facet of the gemstone, as well as the relative locations and angles of intersection of the many facets. In an embodiment, such a model is generated from a real-world diamond by a DiaMension™ tool running DiaVision™ software, both available from Sarin Technologies Ltd. (Sarin USA, New York, N.Y.). Other embodiments utilize other similar software programs. Such a gemstone model is typically referred to as a "skin." Other methods for creating a model of a gemstone may be used, including the generation by a user of an appropriate data set defining a hypothetical gemstone, such as may be useful for gemstone design purposes. In the embodiments of ray tracing methods depicted by FIG. 4, any of the various methods now known or later developed for generating the gemstone model may be used in the step of creating a gemstone model 10.

In an embodiment, the gemstone model is stored as an electronic file for access by a processor, such as a computer processor that will perform a ray tracing algorithm. Depending upon how such an electronic file is created, its format may be changed to enable access to the data therein by such a processor performing the ray tracing algorithm. An example of such a file format change is generally described in the incorporated patent applications: U.S. patent application Ser. Nos. 11/018,042, 11/018,743, 11/018,742, 11/018,744, and 11/388,384.

Figure 4:
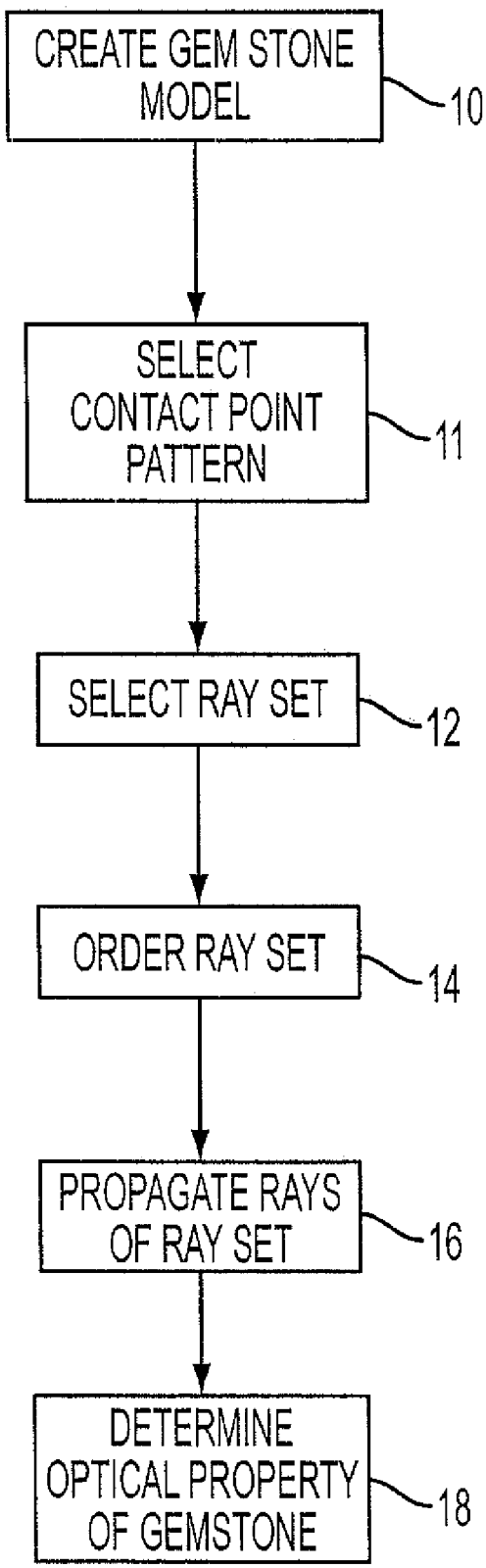
FIG. 4 shows a flow chart of an embodiment of a method for determining an optical property of a gemstone.

A ray tracing algorithm utilizes model light rays to investigate optical properties of a model substance or material, such as the model gemstone generated in step 10 of FIG. 4. A light ray in this context can be thought of as a stream of photons traveling along a line (i.e., in one dimension). Most often such a ray is modeled in simplified terms so as to be represented by a straight line segment between a point of origin and a point of contact with a modeled surface (e.g., on a gemstone) within the space defined about the surface (e.g., about the gemstone). In such a simplified model, the ray is not affected by any interactions (e.g., other electromagnetic forces), except those interactions at a boundary between substances (i.e., at surface boundaries, such as the boundary between a gemstone and the ambient air modeled to exist about the gemstone).

After contact with a surface, such a ray is generally either reflected or refracted, though the potential exists that a portion or all of the energy of the ray could be partially absorbed or scattered by the surface or by bulk in-homogeneities. After either a reflection or refraction, a new direction for the ray is determined. To determine a new direction, a ray tracing algorithm generally takes account of several parameters of the modeled system (e.g., the gemstone, the ambient air, and illumination source), such as the initial direction of a light ray, the ray's contact point on the surface of the gemstone, the refractive index of the gemstone, the orientation of the surface of the gemstone, normal line to the facet, and other parameters. Under the simplified ray model discussed above, once the new direction is determined, a new line segment is used to represent the ray. Such a new line segment is generally defined by and located between the surface contact point giving rise to the reflection or refraction (now, a new point of origin) and the next point of contact of the ray with another facet. In an embodiment this process of determining: (i) the effect on a ray of its interaction with a surface at a contact point, (ii) a new direction (whether or not the direction actually changes) for the ray, (iii) a new contact point, and (iv) repeating these steps, is simply referred to as the step of propagating rays 16, as shown in FIG. 4.

Performing a ray tracing analysis of a gemstone essentially requires modeling (i.e., tracing) the propagation of one or more model light rays generated by a one or more model light sources into, through, and out of a model gemstone. Based upon an initial direction and location of a ray, a ray tracing algorithm will determine a first surface (e.g. a gemstone facet) impinged by the ray. In the context of an analysis of a gemstone, once it has been determined that a facet has been impinged upon by a ray, a further determination is made as to the effect of the interaction of the light ray with that facet. The interaction may lead to the light ray being transmitted through the facet and refracted, it may be reflected, it may be absorbed, or some combination of any of these effects may occur. After the ray has been refracted into the gemstone through the first impinged facet, a new direction for the refracted ray is determined as well as is the next facet intersected by this refracted ray. The procedures by which a direction for the reflected or refracted ray is determined, and by which the next facet impinged thereby is determined (which procedures are not specifically described herein, but are either now known or may be later developed in the art) generally will repeat until the ray exits the gemstone, as indicated when no intersected facet is found or when no reflection is determined to have occurred at the last facet impinged by the ray (i.e., only a refraction out of the gemstone occurs).

After the ray enters the gemstone by being refracted through a facet, one or more internal reflections may occur as a result of one or more interactions between the ray and various facets of the gemstone. Any such internal reflection may also involve a part of the light ray being refracted out of the gemstone. In an embodiment, the portion of the ray refracted out of the gemstone is analyzed by the ray tracing algorithm as part of the determination of gemstone optical properties. Moreover, after one or more internal reflections, generally the ray (or the portion of the original ray that has not yet been refracted out of the gemstone) is refracted out of the gemstone through one of the facets. Further, it is possible that no reflection occurs inside the gemstone, and the ray is immediately refracted out of the gemstone without substantial reflection, after having first been refracted into the gemstone.

Typically, in the operation of a ray tracing algorithm one or more spatial reference points or surfaces are defined as locations to collect data on the model light rays after the modeled propagation of the rays through and out of the gemstone. Analyses of such data allow for determinations of the optical properties of a gemstone, including determinations of a ray's intensity, frequency, point of origin, or a correlation between a ray's point of origin and the point at which it exits the gemstone, or the intersection point with an evaluation reference surface outside the gemstone, for example. In an embodiment, such a determination is performed in the step of determining an optical property of a gemstone 18, as shown in FIG. 4. Detailed descriptions of reference points or surfaces at which these determinations are made, the types of analyses performed, and the types of information obtained are presented in the patents and patent applications incorporated herein, as well as elsewhere. Such details are not critical to this disclosure, however, and will not be further described herein.

An aspect of the invention is the selection of the location and orientation within the model space of the rays that are processed using the ray tracing algorithm. The selected rays, whether one or more, are referred to herein as a ray set. In an embodiment, selection takes place during the step of selecting a ray set 12, as shown in FIG. 4. In an embodiment, the ray set is further defined as an ordered set of rays. As also shown in FIG. 4, in an embodiment, ordering takes place in the step of ordering the ray set 14. Unless otherwise stated herein, it is presumed that the ray set has been ordered, such that references to the ray set are references to an ordered ray set.

Figure 2A:
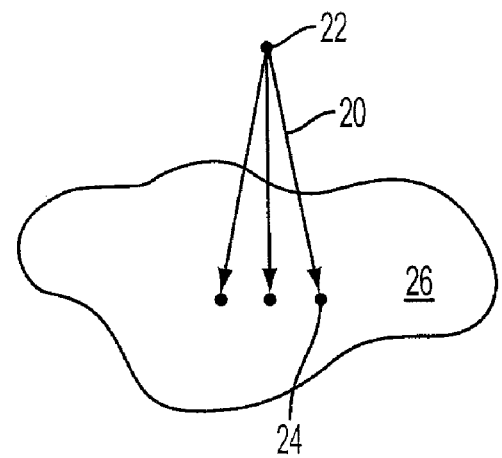
FIG. 2 shows portions of alternate embodiments of ray sets emanating from point sources to impinge upon a gemstone surface.

Examples of ordered sets of rays are shown in FIG. 2. In an embodiment as shown in FIG. 2A, the illumination model comprises a single point source that is modeled to emit spatially incoherent light. In this embodiment, the single point source generates the complete ordered set of rays used by the ray tracing algorithm. A representation of part of such a ray set is shown in FIG. 2A, in which it can be observed that three successive rays 20 emanating from a point source 22 have relatively closely spaced contact points 24 on the surface 26 of a gemstone, and have directions of orientation within the model space that are different by a relatively small angle.

Figure 2B:
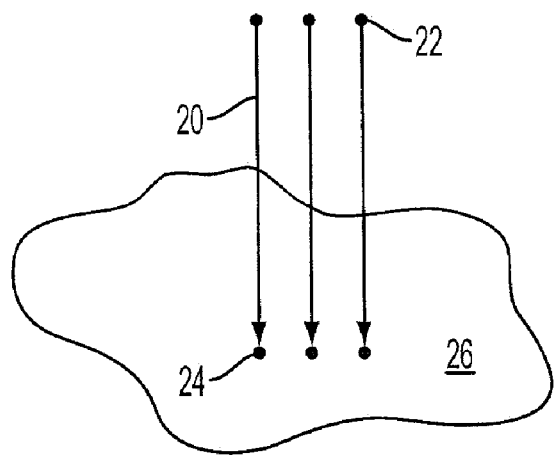
Figure 2C:
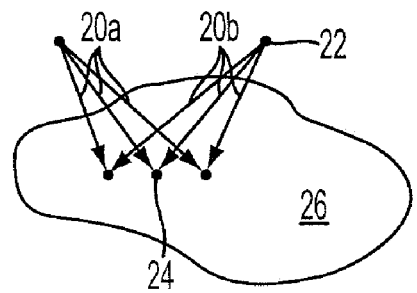

In alternate embodiments, point sources 22 emit rays in only a single direction. In an embodiment, as shown in FIG. 2B, the illumination model comprises multiple point sources 22, each modeled to emit light in only a single direction, and each modeled to emit light in the same direction, such that rays 20 emitted from each of the point sources 22 are parallel, that is a collimated light beam. An example of part of a ray set generated by such an illumination model is shown in FIG. 2B, in which it can be observed that three successive rays 20 emanating from three successive point sources 22 have relatively closely spaced contact points 24 and essentially identical directions. In a still further alternate embodiment, an illumination model comprises point sources 22, each of which emit rays in only one direction, but each of which does not emit rays in the same direction.

Correlated to the ordered set of rays 20, is an ordered set of contact points 24. In an embodiment, each ray 20 in the ray set will have a corresponding contact point 24 on the gemstone surface 26. For an illumination source modeled with point sources emitting coherent rays, each point source 22 is correlated with only one contact point 24, as shown in FIG. 2B. In this circumstance, in which there is a one-to-one correlation between rays 20 and contact points 24, not only does the ordered set of rays 20 define the ordered set of contact points 24 and vice versa, but also the ordered set of rays 20 and contact points 24 defines an ordered set of point sources 22. In an embodiment as shown in FIG. 2A, in which the illumination source is modeled with point sources 22 emitting incoherent rays 20, however, each point source 22 may be correlated with more than one contact point 24. Therefore, while the ordered set of rays 20 still defines an ordered set of contact points 24, the ordered set of contact points 24 does not define a specific ordered set of rays 20, since from the same illumination source (i.e., defined set of point sources 22) more than one ordered set of rays 20 may be selected to impact at the same set of contact points 24. Compare ray sets A and B in FIG. 2C, having rays labeled 20a and 20b respectively, each of which, while comprising no rays in common, impinges upon and thereby correlates to the same set of contact points 24. Further, depending on the orientation and location of the surface 26 of the gemstone to be interrogated with impinging light rays 20, and depending on the location of the point sources 22 relative to the surface 26, in some embodiments not all point sources 22 in the illumination model will have corresponding contact points 24 on all surfaces to be interrogated.

In an embodiment, the set of rays is ordered according to either one or both of the point of contact between the ray and the gemstone, and the directional orientation of the ray. In an embodiment, the set of rays is ordered in a manner such that, starting with a first ray (however such first ray is selected) each successive ray in the order has a contact point relatively close to the contact point of the prior ray in the order. In a preferred embodiment, successive rays within the order not only have contact points on the surface of the gemstone that are separated by relatively little distance, but also have a direction (orientation within the space) relatively similar to that of the prior ray in the order.

Figure 3A:
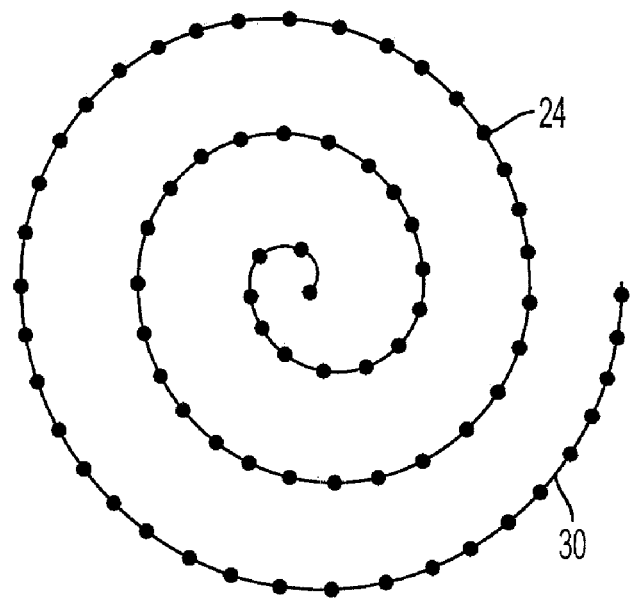
FIG. 3 shows alternate embodiments of contact point patterns defined by expanding rotational paths.

In an embodiment, an aspect of the present invention is that the ordered set of contact points 24 on the surface 26 of the gemstone is arranged in a particular pattern, as shown in FIG. 3. In an embodiment, a path 30 generated by connecting successive contact points 24 (i.e., successive contact points 24 within the ordered set of contact points 24 defined by the ordered set of rays 20) with line segments (whether straight or curved) generally defines the pattern. In an embodiment, the spatial arrangement of successive contact points 24 is such that the contact points 24 are points on a line (whether straight or curved), i.e., all of the individual line segments connecting successive contact points 24 are line segments of a single line, such line embodying a defined path 30. In an embodiment the path 30 is a line defined by a single mathematical function, and such a function generally defines a spiral. In an embodiment, such a function particularly and exactly defines a spiral. Thus, in an embodiment, the spatial arrangement of successive contact points 24 places successive contact points 24 along the path 30 of a spiral, as shown in FIG. 3A.

The path shown in FIG. 3A represents an Archimedes' spiral, which is a spiral having a constant distance between turns. This spiral is two dimensional, i.e., lies in a plane. Such a spiral is useful particularly for interrogating a planar surface of a gemstone, such as an individual facet. Because a gemstone is a three dimensional object, however, a spiral used as the path defining the contact point pattern for interrogating more than one facet of a gemstone (e.g., the crown) must be three dimensional also. In an embodiment, such a three dimensional spiral is obtained by projecting a two dimensional spiral, such as that shown in FIG. 2A onto the surface of the gemstone. In another embodiment, a spherical spiral having the property that turns are equidistant along a spherical surface that approximates the gemstone crown is projected onto the actual crown surface. In still further embodiments, spirals on other three dimensional surfaces are projected onto the actual surface of a gemstone.

When performing a ray tracing analysis on a diamond cut as a round brilliant, the preferred shape for such a path 30 defining the pattern of contact points 24 (according to the sequential connection of the ordered contact points 24) is a spiral. That is, the spiral pattern, which is essentially circular in nature, can be used to distribute contact points reasonably evenly across the entire gemstone crown, which is also circular in nature. Since the crown is the area of the gemstone generally considered to receive the light most important in evaluating the optical properties of a gemstone (as opposed to light entering the gemstone through the pavilion), distributing contact points 24 across the crown is generally of the greatest interest for optical property determinations of such a gemstone.

While many types of spirals exist (i.e., various mathematical functions describe regular, undistorted spirals in polar or spherical coordinates, including a logarithmic spiral, a hyperbolic spiral, a lituus spiral, and an Archimedean spiral), a spiral having a constant distance between turns is preferred for analysis of the aggregate optical properties of a round brilliant gemstone having light that enters through the crown, because of the potential to evenly distribute contact points 24 across the surface of the gemstone using such a spiral. Because a round brilliant cut diamond has a circumference at the girdle that is approximated by a circle, the spiral pattern (also having a generally circular base shape) of contact points 24 is particularly suited to the optical property analysis thereof.

In other embodiments, other gemstones (e.g., ruby, sapphire, emerald) and other gemstone cuts (e.g., princess, oval, heart) are interrogated with a similar regular spiral pattern (whether defined in two or three dimensions). In still further embodiments, other similar or dissimilar patterns of contact points are used. Particularly for gemstone cuts other than the round brilliant, other patterns are used in some embodiments. As an example, a ray tracing analysis may use a distorted spiral pattern, which has a base shape (e.g., the base shape of a regular, undistorted spiral, such as an Archimedean spiral, is a circle) that mimics the shape of the largest, horizontal circumference of the gemstone (the horizontal direction being defined generally perpendicular to an axis through the table and culet of the gemstone), just as the circular base shape of the Archimedes' spiral mimics the generally circular shape of a round brilliant gemstone at its largest horizontal circumference, whether that circumference be oval, rectangular, heart, pear, or another shape.

Just as with an Archimedes' spiral, the path of a distorted spiral, no matter the base shape, grows to traverse a segments of an incrementally larger base shape (whether a segment of an incrementally larger circle, square, oval, heart, etc.) with every incremental portion of a revolution around a central axis. Such a path, for which the base shape is incrementally increasing with every incremental portion of revolution, is termed an expanding rotational path. For example, if the expanding rotational path is based on a circle (an undistorted spiral) the radius of the circle increases with each portion of a revolution; whereas if the expanding rotational path is based on a square (a distorted spiral), the length of a side increases with every ninety degree portion of a revolution. Other shapes, whether two or three dimensional, similarly expand with incremental rotations.

Figure 3B:
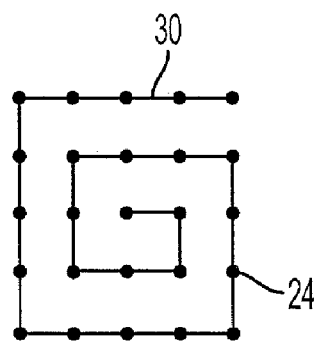
Figure 3C:
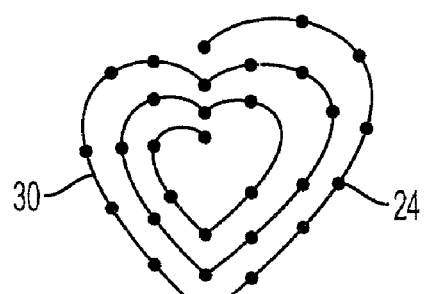

For instance, because the circumference of a princess cut gemstone is approximated by a square, in an embodiment, a regular grid pattern, as shown in FIG. 3B, is useful as a pattern of contact points (whether as a two dimensional path or as a projection onto the three dimensional surface of a gemstone). The contact points 24 of the pattern shown in FIG. 3B are ordered such that connection of successive contact points 24 by straight line segments in order sequence generates a path 30 that appears as a distorted spiral comprising a square base shape. Further, as shown in FIG. 3C, a heart base shape is used in an embodiment, such as in an analysis of a heart-shaped gemstone, though this pattern is not limited to such applications. Such paths are termed distorted spirals, and more specifically termed, as correlated to the base shape of such a distorted spiral, a square spiral, a heart spiral, and so on (whether in two dimensions or in three dimensions).

The specific number of points and their distance apart on the path 30 can vary widely and in different embodiments points 24 can be separated from 1 to 10,000 micrometers. Typically, however, the points 24 will generally be separated by about 10 to about 100 micrometers. This distance being selected based on the desired resolution of the test as well as the actual resolution of any display device displaying the output so as not to perform calculations that are simply not displayable based on other technology in use in the system or method.

Now referring again to FIG. 4, the steps of the method therein illustrated have been described individually above, and will be described here as a collection. In an embodiment of a method for determining an optical property of a gemstone using ray tracing, a gemstone model is created in step 10, A pattern of contact points 24 (e.g., in an embodiment, defined by the path 30 of a line connecting these contact points 24) is selected in step 11. A set of rays 20 emanating from a model illumination source is selected in step 12. The set of rays 20 so selected is ordered in step 14 so that the contact points 24 associated with each ray 20 in the set of rays 20 corresponds with an ordered set of contact points 24 defined by the pattern selected in step 11. The rays are propagated through the gemstone in step 16 according to their order within the set of rays 20. And, one or more optical properties of the gemstone are determined in step 18.

In another embodiment, an aspect of the present invention is that the path of propagation of a first model light ray (i.e., "first" meaning prior in sequence relative to a "second" or subsequent ray, and not meaning first in absolute position relative to all other rays in the ray set) is used as an approximation of the propagation path of a successive model light ray. This process is generally referred to as the system or method utilizing "path memory." In an embodiment in which rays are propagated through a gemstone, rather than utilizing the actual path of the first ray, the path of a first ray is defined simply by the ordered series of gemstone facets intersected by this ray. Using such an approximation (in which a propagation path is defined only by impinged facets), two rays are considered to have the same path if they each impinge upon the same facets in the same order, no matter how distant in space are the literal paths of these two rays. In an embodiment, such a propagation path for a light ray is determined by propagating the ray through the gemstone (e.g., as such propagation is described above), and recording the facets impinged by the ray during such propagation.

Figure 5:
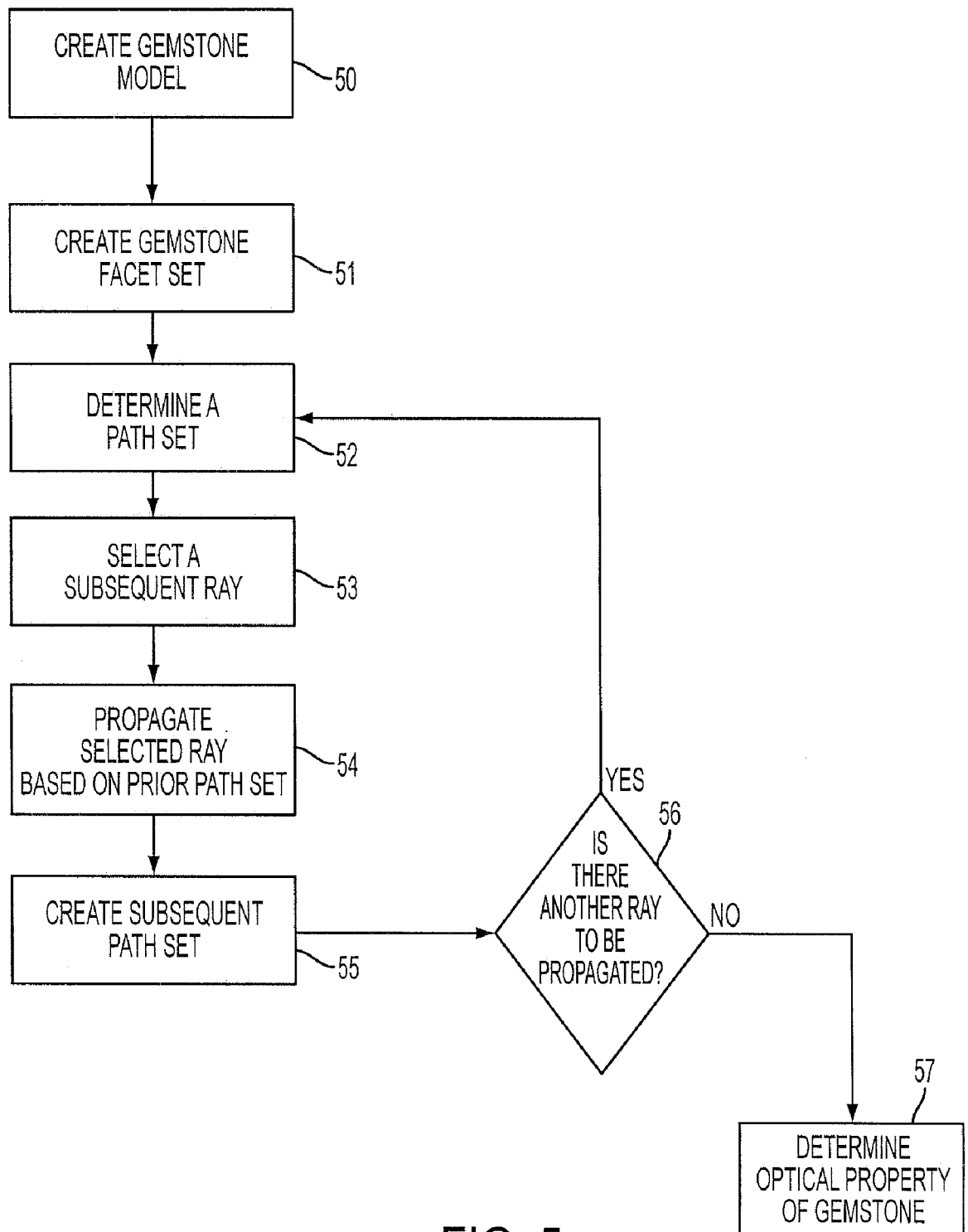
FIG. 5 shows a flow chart of an alternate embodiment of a method for determining an optical property of a gemstone.

In an embodiment, in order to determine whether any facet in a set of facets comprised by the gemstone is impinged upon by a first ray, a comparison is made of the direction and location of this first ray (such direction and location being determined for each segment of this ray's propagation path, i.e., at ray origination and after each reflection or refraction of the ray thereafter) with some random or ordered series of facets in the gemstone facet set without reference to any prior ray's propagation. In an embodiment, each facet impinged by the ray has an associated facet identifier that is recorded as a way to document the ray's path. The set of facet identifiers corresponding to the facets impinged by this ray is termed the ray's path set, which in an embodiment of a method for evaluating an optical property of a gemstone is determined in step 52, as shown in FIG. 5.

Figures 7, 8:
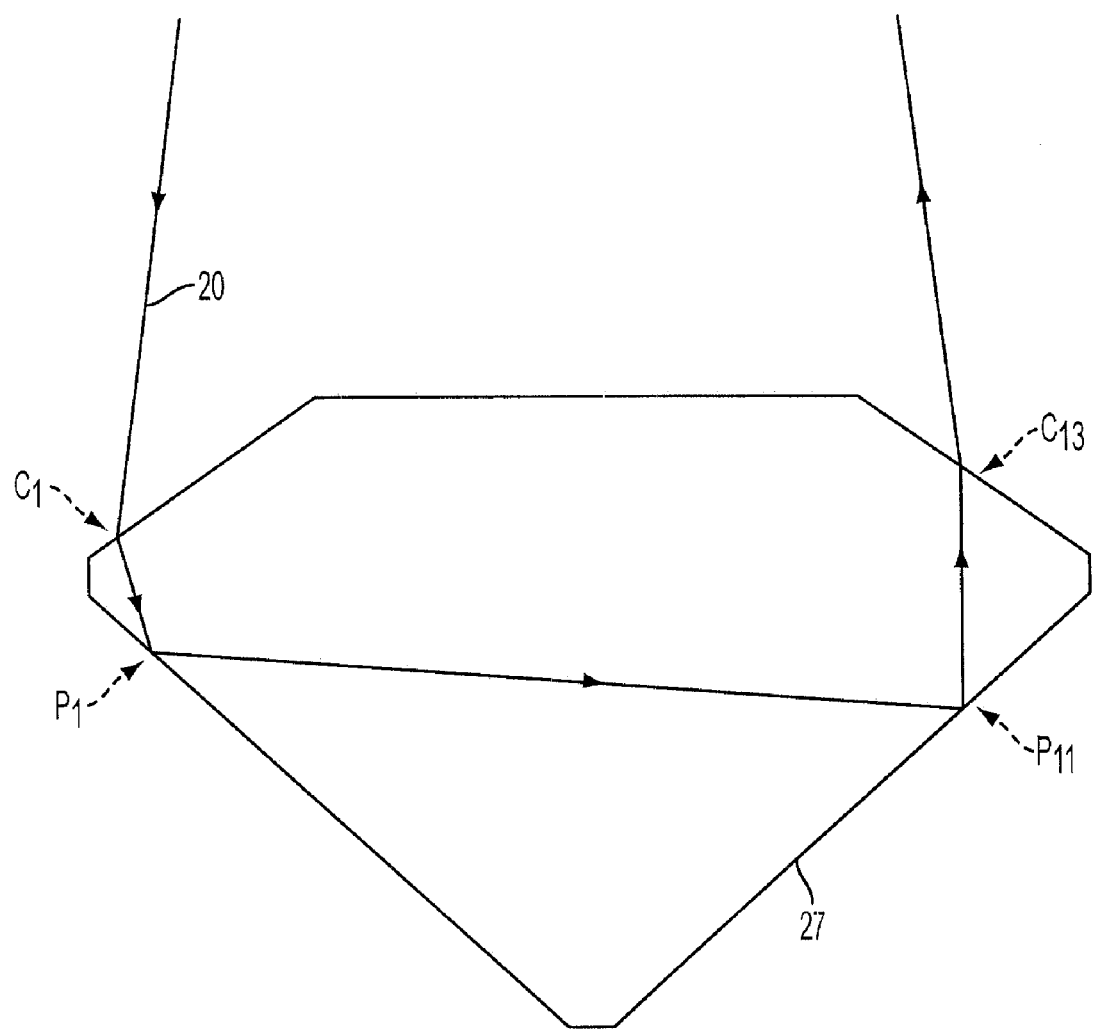
FIG. 7 shows a propagation path for a ray through a gemstone and the facets impinged thereby.
FIG. 8 shows a tabular representation of a path set and a predicted path set comprising facet identifiers.

A path set for any and each ray propagated through a gemstone is the ordered set of facet identifiers corresponding to the facets impinged by the ray, wherein the order of the facet identifiers in the path set is the same as the sequential order of the facets as impinged upon by the ray. An example of a path set will be described with reference to FIG. 7, illustrating a propagation path for a ray 20. In this example, the ray 20 enters a gemstone 27 via a refraction through a crown facet identified as $C_1$, then impinges upon and is reflected from a pavilion facet identified as $P_1$, then impinges upon and is reflected from a pavilion facet identified as $P_{11}$, then impinges upon and is refracted out of the gemstone through a crown facet identified as $C_{13}$. The path set for this ray is the ordered set $\{C_1, P_1, P_{11}, C_{13}\}$.

FIG. 8 represents the path set of the ray 20 in FIG. 7 in tabular form, in part as an aid to further describing this path set. In the table shown in FIG. 8, the ray of FIG. 7 is termed the first ray. Each facet identifier in the path set occupies a position within the order of the set (i.e., a position relative to the position of each other member of the set) that is the same as the position occupied by the facet so identified within the order of the facets impinged during the ray's propagation. Thus, the facet identifier for the first facet impinged by a ray occupies the first position in that ray's path set. The facet identifier for the second facet impinged by that ray occupies the second position in that ray's path set, and so on. Considering the path set arising from propagation of the ray illustrated in FIG. 7 and consisting of $\{C_1, P_1, P_{11}, C_{13}\}$, since the facet identified as $C_1$ is first impinged (i.e., occupies the first position in the sequence of facets impinged upon by this ray, as shown in FIG. 7), this facet identifier, $C_1$, occupies the first position within the ordered set of facet identifiers that is the path set for this ray, as shown in FIG. 8. In general terms, the ordinal number associated with the facet identifier within the ordered path set (e.g., first, second, third, etc.) is the same as the ordinal number associated with the facet so identified within the sequence of facets impinged upon during propagation of the ray.

In an embodiment, the approximation of a subsequent ray's path by a prior ray's path is manifest by presuming the path set for the subsequent ray is identical to the path set for the prior ray, and performing propagation of the subsequent ray based on this assumption. An embodiment of such a method is shown in FIG. 5, wherein a model gemstone is created in step 50. The facet set for this gemstone is created in step 51, A path set for a ray is determined in step 52. A ray is selected for propagation in step 53. The selected ray is propagated in step 54, based on a prior path set, which in an embodiment is the path set determined in step 52. The path set for the selected ray as propagated is created in step 55. Step 56 determines whether the path set determination, subsequent ray selection and subsequent ray propagation steps should be repeated. In an embodiment, if repeated, the determination of a path set in step 52 is performed by electing the path set determined in step 55 and therefore propagation in step 54 of another selected ray is based on that path set previously determined in step 55. Based on the propagation of rays, an optical property of the gemstone is determined in step 57.

Once the prior ray's path set has been created, whether in whole or in part, rather than sequentially testing the facets in the gemstone facet set (whether randomly or in ordered series without reference to a prior ray's propagation) to determine whether or not each is impinged by the subsequent ray, the facets tested for impingement by the subsequent ray are selected based on the path set created for a prior ray, or the path memory, since the path set for each of these rays is presumed to be identical.

In an embodiment, this assumption is only applied to rays (i.e., a prior and a subsequent ray) that are immediately successive one to the other in the ordered set of rays selected for propagation, e.g., as such order is determined in step 14 of FIG. 4. In a specific example, the two immediately successive rays are termed a first ray and a second ray, though this terminology (i.e., first and second) is not meant to indicate that either ray is the first ray in the set of rays selected for propagation, and only to suggest that these rays are immediately successive one to the other within such a ray set. Under this assumption, the second ray is presumed to first impinge upon the facet that is the first facet listed in the path set for the first ray. The second ray is presumed to next impinge upon the facet that is listed second in the first ray's path set. The succeeding sequence of facets impinged upon by the second ray (i.e., the third, fourth, fifth, etc.) are presumed to be those facets as listed in order in the first ray path set. That is, there is a correlation between the facets identified in the various positions of the path sets of successive rays, and that correlation is presumed to be such that these facet identifiers are identical in identical positions of successive rays. Thus, during propagation of the second ray, the ordered facets in the first ray path set become the ordered set of predicted facets of impingement for the second ray, as shown in FIG. 8, wherein the predicted path set for the second ray is identical to the actual path set for the first ray.

In many cases, the first ray path's set is only useful if the second ray is sufficiently close to the first ray so that there is some expectation that the rays will follow the same path. Therefore, in an embodiment, the path memory methodology is only used if the successive rays are less than a few degrees separated. Preferably, such rays will be separated from between about 1 and about 100 arc-seconds and typically path memory will be used for rays which are about 10 to about 100 arc-seconds separated.

In general terms, under this assumption, the facet next impinged by a successive ray (whether such next facet impinged is the first, second, third, etc. facet impinged thereby) is presumed to be the facet identified at the position within the prior ray path set that is the same as the position at which such next impinged facet will be recorded within the successive ray's path set. So, considering the example path sets shown in FIG. 8, a prediction for the third facet impinged upon by the second ray is obtained by reference to the facet identifier representing the third facet impinged upon by the first ray, i.e., the facet identifier in the third position of the first ray path set ($P_{11}$, in this case). From such example, it is understood that the prior ray path set need not be complete in order to be used to generate a predicted facet of impingement of a successive ray; and the only portion of the prior ray path set that must be known is the facet identifier in the position within the prior ray path set that corresponds with (i.e., is identical to) the position in the successive ray path set to be predicted.

In an embodiment, this assumption is used during propagation of a second ray (as in step 54 as shown in FIG. 5) as the basis for the determination of each facet next impinged by the second (i.e., immediately successive) ray during propagation thereof up to the last ("nth") facet in the first (i.e., immediately prior) ray path set (which first ray path set includes a total number of facet identifiers here labeled as "n"), unless it is determined that the second ray is refracted out of the gemstone before impinging upon the last (nth) facet in the first ray path set. In an embodiment, if the ray is refracted out of the gemstone prior to testing for impingement upon each of the facets in the first ray path set, then such testing for impinged facets stops. Further, if in an embodiment the second ray has not been refracted out of the gemstone after impinging upon the last (nth) facet in the first ray path set, then the second ray is further propagated by determining the location and direction of the reflected portion of the second ray, followed by a determination of the next facet impinged upon by the second ray, without regard to the first ray path set. In an embodiment such next facet impinged by the second ray (after the second ray has impinged upon an nth facet) is determined using a randomly selected or an ordered series of facets from the gemstone facet set (or sets) without reference to a prior ray path set. While described here for a first and a second (immediately successive) ray, this procedure is used, in an embodiment, for any rays related as prior and subsequent rays within an ordered ray set.

Generally, the second ray path set (actual as opposed to predicted) is saved in memory, as was the first ray path set. Both ray path sets may continue to be saved during part or all of the ray tracing process (i.e., tracing of the multiple rays comprised by the ray set), or only the latest path set determined may be saved. Alternately, the first ray path set may be overwritten as the second ray path set is created, so that at any given moment, a portion of the first ray path set corresponding to facets later in the order (of the first ray path set) remains saved, while a portion corresponding to facets earlier in the order (of the first ray path set) has been overwritten with an early-order portion of the second ray path set.

Moreover, ray path sets for multiple rays may be determined in quasi-parallel fashion whereby each of one or more but fewer than a substantial number of facets identified in the path set are determined sequentially for multiple rays, followed by a sequential determination of another one or more but fewer than a substantial number of facets in the path sets for each of these rays, and so on. So for example, a first position facet identifier is determined for a first ray path set, followed by determination based on this first ray partial path set (comprising only the first position facet identifier) of a first position facet identifier for a second ray path set, followed by a determination based on this second ray partial path set (comprising only the first position facet identifier) of a first position facet identifier for a third ray path set, and so forth, until the first position facet identifiers have been identified for all or some portion of the rays in the ray set, after which the second position, third position, fourth position, etc. facet identifiers will be likewise identified.

Instead, when ray path sets are determined serially, the entirety or a substantial portion of a ray path set will be determined according to propagation of the ray, followed by determinations of the entirety or a substantial portion of subsequent ray path sets. This sequence of path set determinations will be continued until some portion or all path sets for rays in the ray set have been determined.

In an embodiment, if it is determined that a ray does not impinge upon the predicted facet of impingement (based on the path set of a previously propagated ray), the next facets tested for impingement by this successive ray are selected from among those facets adjacent to or near to the predicted facet of impingement. For purposes of illustrating the selection of alternative predicted facts of impingement, the gemstone facet will first be described in relation to FIG. 1.

Figure 1:
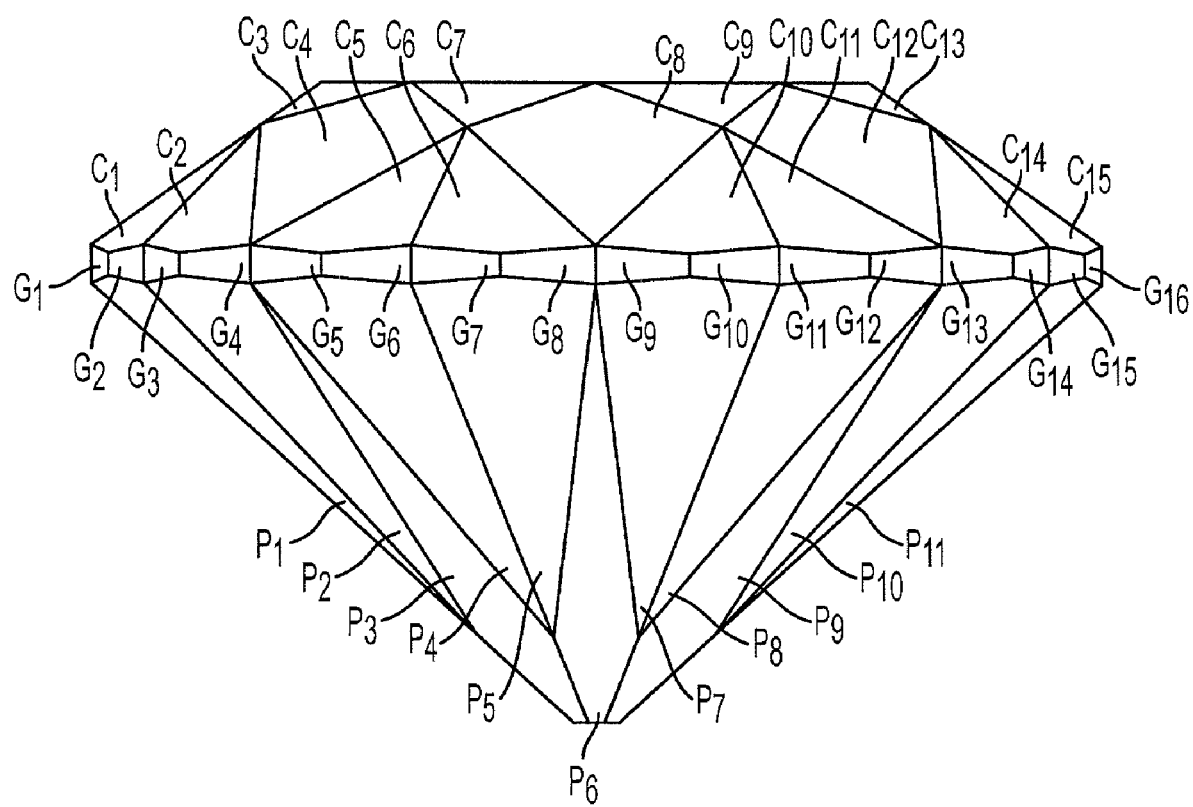
FIG. 1 shows an elevation view of a round brilliant gemstone with facets labeled with facet identifiers.

FIG. 1 illustrates how, in an embodiment, the facets of a round brilliant gemstone are identified and organized into a gemstone facet set comprising three segment facet sets: the crown facet set (C-series set); the girdle facet set (G-series set); and the pavilion facet set (P-series). In an alternate embodiment, the gemstone facet set comprises fewer than all of the facets in the gemstone, and comprises one or more segment facet sets but not all segments facet sets. In a further alternate embodiment the gemstone facet set is not divided into segment facet sets at all, whether or not all facets are included therein.

In the embodiment shown in FIG. 1, within each segment facet set individual facets are numerically ordered. In this embodiment, the ordering of facets corresponds to the spatial location of the facets around the gemstone. In particular, the facets are ordered in this embodiment by arbitrarily numbering a facet "1," choosing a direction around the gemstone, and sequentially numbering adjacent facets of the same segment (crown, girdle, or pavilion) in that direction. If there are n facets of a segment, then the ordered set for that segment has n facets. In particular the girdle would be represented by the ordered list of girdle facets in the set: $\{G_1, G_2 \ldots G_n\}$. In the embodiment shown in FIG. 1, from a perspective looking down on the table of the gemstone, facets are labeled in a counter-clockwise direction. In other embodiments, other methods of ordering the facets are used, including methods which do not identify spatially adjacent facets as sequentially ordered, but for which a different ordering system is used.

As an example of the selection of alternate predicted facets, in an embodiment, the first facet impinged by the first ray is $C_3$. Therefore, the first facet in the first ray path set is $C_3$, and the algorithm will first test facet $C_3$ as the first predicted facet of impingement for the second ray. If the algorithm determines that the second ray does not first impinge upon facet $C_3$ (because of the spatial relationship of this facet and the location and orientation of the second ray), the algorithm next tests facets adjacent to facet $C_3$. In an embodiment adjacent facets are those facets nearest in the order of the segment facet set, such as with respect to this example and as shown in FIG. 1, facets $C_2$ and $C_4$. In a preferred embodiment, adjacent facets are spatially adjacent to the predicted facet of impingement, whether or not they are "adjacent" within the ordered set.

If none of the first selected adjacent facets (e.g., $C_2$ and $C_4$) is impinged, facets adjacent to these first selected adjacent facets, e.g., facets $C_1$ and $C_5$ in this example (see FIG. 1), are tested for impingement by the second ray, and so on. In the event that one of the adjacent facets so determined is impinged by the second ray, the algorithm continues with a determination of the direction of the second ray after interaction with this impinged facet (which is adjacent or near to the predicted facet of impingement), and then to a determination of the next facet impinged by this ray based on the predicted facet of impingement with reference to a prior ray path set.

Whether testing the first adjacent facets (e.g., $C_2$ and $C_4$ in this example) or more distantly adjacent facets (e.g., $C_1$ and $C_5$ in this example), generally the adjacent facets are tested sequentially for impingement by the ray. In an embodiment, the determination of which adjacent facet is tested first (e.g., $C_2$ or $C_4$), is an arbitrary decision. In an alternate embodiment, however, there is one or more rational criteria applied to determine which adjacent facet is tested first, such as if one such facet shares a closer adjacency to the predicted facet of impingement or to the actual location of impingement by the first ray than does another facet, or for any other reason is more likely to be impinged upon. Further, in an embodiment for which the gemstone facet set sequentially orders spatially adjacent facets of one segment of the gemstone (e.g., the girdle facet set sequentially orders spatially adjacent girdle facets in a counter-clockwise direction around the entire circumference of the gemstone, $G_1, G_2, \ldots G_n$), as in FIG. 1, the first and last facets in the set generally are also adjacent (e.g., $G_1$ is adjacent to $G_n$), and are treated as such when determining adjacent facets for testing, when necessary.

In an embodiment, in the event that a ray does not impinge on the predicted facet of impingement, only adjacent facets within the segment facet set containing the predicted facet are tested for impingement, until an impinged facet within this segment is identified or all facets in this segment facet set have been tested without identifying an impinged facet. In an embodiment, if none of the facets within the segment facet set containing the predicted facet of impingement are found to be impinged, the algorithm begins to test facets in another segment facet set, which segment facet set may be arbitrarily or rationally selected. Further, selection of the order in which to test facets within this next segment facet set may be arbitrary or rational, or may be arbitrary for some selections and rational for other selections.

Moreover, in an embodiment, regardless of whether the gemstone facet set is comprised of more than one segment facet set, facets adjacent to the predicted facet of impingement are selected from more than one segment of the gemstone. That is, for example, in an embodiment for which the crown, girdle and pavilion facet sets have been defined (as in FIG. 1), in addition to adjacent facets from the girdle facet set, one or more facets from either or both of the crown and pavilion facet sets may be defined as adjacent to a facet in the girdle facet set. More particularly, by way of example, as shown in FIG. 1, not only may facets $G_5$ and $G_7$ be adjacent to facet $G_6$, but also facets $C_5$ and $P_5$ may be adjacent to facet $G_6$. In an alternate example (not shown), not only may facets $G_1$ and $G_3$ be adjacent to facet $G_2$, but also facets $C_1, C_2$, and $C_3$, as well as facets $P_1, P_2$, and $P_3$ may be adjacent to facet $G_2$. In such an embodiment, then, if facet $G_2$ is not impinged by a certain ray, even though it is the predicted facet of impingement, each of the facets $G_1, G_3, C_1, C_2, C_3, P_1, P_2$, and $P_3$ may be tested as adjacent facets (in any order whether rationally selected or not), until an impinged facet is determined. In an embodiment, facets within the same segment are tested first ($G_1$ and $G_3$, in this example), followed by testing of identified facets within a second segment (e.g., $C_1$, $C_2$, and $C_3$), followed by facets in a third segment ($P_1$, $P_2$, and $P_3$).

In an embodiment, the determination of spatially adjacent facets is made during the definition of the gemstone facet set. For example, in an embodiment, adjacent facets are labeled with a common identifier. In a more particular example, a numerical component of a facet identifier is the same for spatially adjacent facets, as in, crown facet $C_5$ and girdle facet $G_5$ being adjacent. Recognizing that each segment likely has a different number of facets from each other segment, in an embodiment, segment facet sets for segments with fewer facets may not include all numerical identifiers, or may have blank or duplicate entries, such as may be the case when it is desired that the segment facet sets have equivalent numbers of elements. Alternately, segments with a greater number of facets may include sub-numeral or other further facet identifiers so each facet is uniquely identified while still allowing identification of spatially adjacent facets in different segments according to a numerical identifier, as in, crown facets $C_{5a}$, $C_{5b}$, and $C_{5c}$ being adjacent to girdle facet $G_5$. As these are merely example facet identifiers, there is nothing inherently preferred in using numerical identifiers with alphabetic sub-identifiers, and many alternate facet identification schemes are possible, as is understood by one of ordinary skill in the art.

In an embodiment, such as an embodiment described above, spatially adjacent facets in various segments are identified by numerical identifiers that are the same for each segment of the gemstone. In this embodiment, if none of the segments spatially adjacent to a predicted segment of impingement are determined to be impinged, the ray tracing algorithm will test facets having adjacent numerical identifiers. That is, when the predicted facet of impingement is $G_5$, and all girdle, crown, and pavilion facets identified with the numeral 5 have been tested, then all girdle, crown and pavilion facets identified with either the numeral 4 or 6 will be tested next, followed by all facets identified with the other of the identifiers, 4 or 6.

Figure 6:
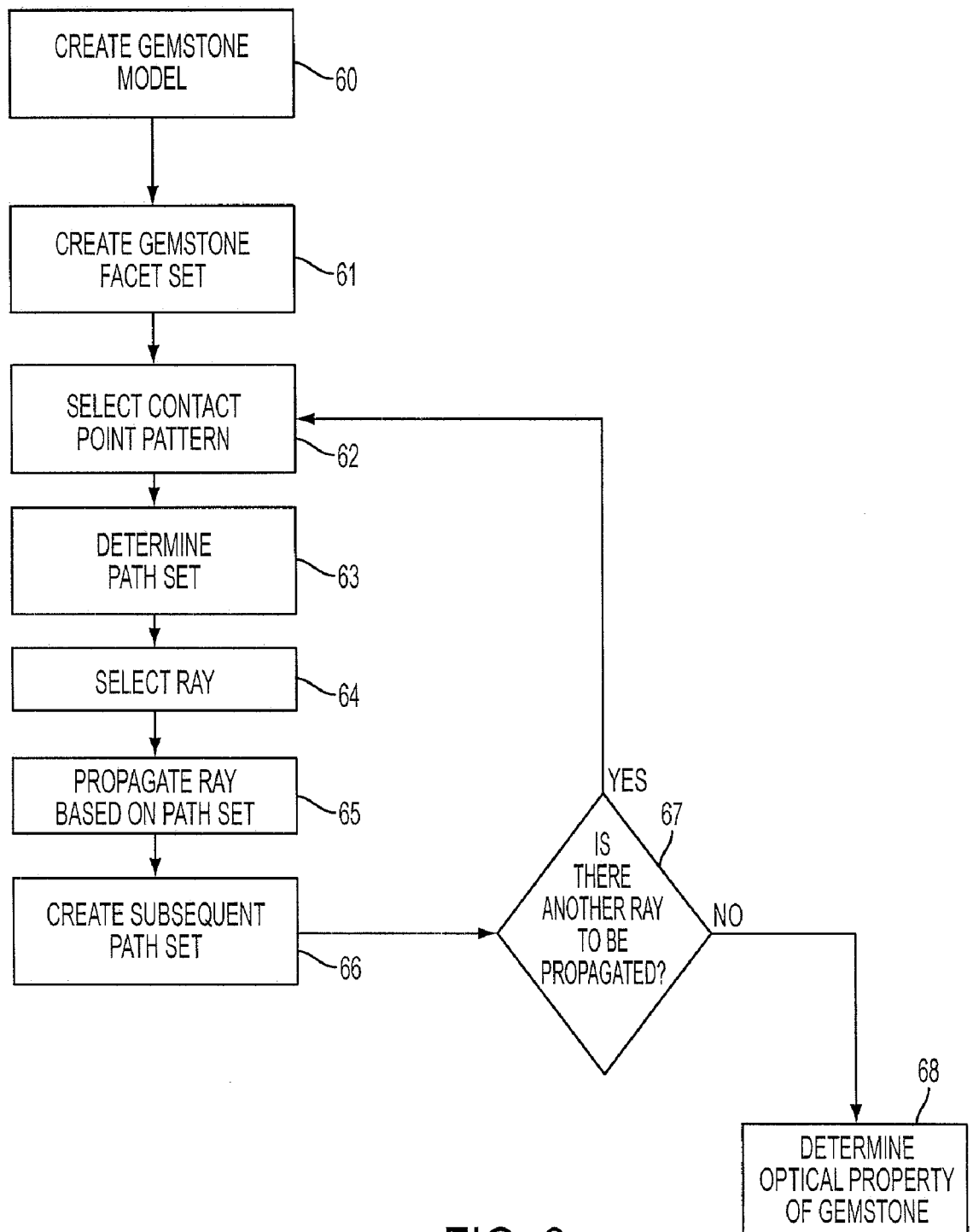
FIG. 6 shows a flow chart of another alternate embodiment of a method for determining an optical property of a gemstone.

In an embodiment, an aspect of the invention is the utilization of both modeling approaches discussed above. That is, in an embodiment, a ray tracing algorithm makes use of both a pattern of contact points for model rays impinging on the surface of the gemstone, and an approximation of the path of a later-propagated ray using a path set or a portion thereof created during propagation of an earlier-propagated ray. An embodiment of such a method is shown in FIG. 6. A gemstone model is created in step 60. The facet set for this gemstone is created in step 61. A pattern of contact points 24 (e, g, in an embodiment, defined by the path 30 of a line connecting these contact points 24) is selected in step 62. A path set for a ray is determined in step 63. A ray is selected for propagation in step 64. The selected ray is propagated in step 65, based on a prior path set, which in an embodiment is the path set determined in step 63. The path set for the subsequent ray as propagated is created in step 66. Step 67 determines whether the path set determination, ray selection and propagation steps should be repeated. In an embodiment, if repeated, the repeated propagation in step 54 of another selected ray is based on the path set previously determined in step 66. Based on the propagation of rays, an optical property of the gemstone is determined in step 68.

A potential benefit to utilizing both methodologies in combination is a synergistic effect through which the accuracy of the path approximation methodology (that is, the percentage of times the predicted facet of impingement is actually impinged as predicted) is increased, thereby allowing further gains in computational efficiency over the use of either methodology alone. Computational efficiency gains may be obtained because rays having relatively small deviations in location and direction as judged at their respective contact points (as is generally the case with the ordered rays of the first modeling approach having contact points in a pattern defined by a path) are more likely than rays of widely varying direction and location to follow similar paths through the gemstone, therefore having the same or similar path sets (as is assumed by the second modeling approach). Successively analyzed rays having widely varying location or direction or both as judged at their respective contact points are less likely than rays having relatively similar direction and location variation to have the same or similar path sets.

Under circumstances for which successive rays have similar direction and location as measured at the contact point, it is typical that a series of multiple rays will follow a similar path and, therefore, have the same path set. Generally, at some stage in the ray tracing analysis, when the deviations in ray direction and location have changed significantly enough among the rays in the ordered ray set, there will be a transition in the identity of one or more impinged facets in a path set as compared to path sets for prior rays. That is, in an embodiment, several rays in sequence will have the same path set associated with their propagation. Then, a ray will have such a change in location and direction as compared with a prior ray that its propagation path will be different from the previously modeled ray due to a change in at least one of the facets impinged thereby. In an embodiment, once a facet within a path set changes for a ray as compared to a previously analyzed ray, the remainder of the facets in the path set also change as compared to the facets in the previous path set. In an embodiment, once such a change in path set occurs, a subsequent series of rays within the ray set will again follow a similar path to one another, having the same path set. This new path set will remain constant through propagation of sequential rays within the ray set until there is another transition in the path set as compared to the previous path set, and so forth.

By utilizing a contact point pattern, as discussed above, the ray tracing methodology can also avoid tracing symmetrical ray traces, thereby improving efficiency over a methodology that does test symmetrical traces. That is, the spiral pattern of contact points, whether or not evenly distributed on the gemstone surface, can be made unsymmetrical (unlike the square spiral shown in FIG. 2B, which is a symmetrical distorted spiral pattern) so that no ray will follow a propagation path that is symmetrical with a previously propagated ray. If the gemstone is close to symmetrical, the ray tracing methodology can approximate results of symmetrical rays, without having to calculate the paths. If the gemstone is not symmetrical, a contact point pattern can be selected that results in a reasonable optical property analysis without relying on symmetry.

While the invention has been disclosed in connection with certain preferred embodiments, it should not be understood to be limited by all of the elements described in these embodiments. Modifications and variations of the described embodiments may be made without departing from the spirit and scope of the invention, and other embodiments should be understood to be encompassed in the present disclosure, as would be understood by those of ordinary skill in the art.

The invention claimed is:

1. A ray tracing method useful in evaluating an optical property of a gemstone, said method comprising the steps of:

providing a model gemstone comprising a plurality of facets, each facet being identified by a facet identifier;

providing a pattern of successive contact points on the surface of said gemstone, said pattern being such that the connection of successive contact points with a line generates an expanding rotational path;

selecting a model light ray, said ray having an initial location and direction such that said ray impinges upon a contact point comprised by said pattern;

providing a path set comprising an ordered sequence of at least one facet identifier, said path set sequence corresponding in whole or in part to a sequence of facets impinged upon by a ray propagated through said gemstone prior to propagation of said selected ray through said gemstone;

propagating said selected ray through said gemstone utilizing said path set as a source for identifying a predicted facet of impingement for said selected ray;

creating a subsequent ordered path set comprising at least one facet identifier corresponding to a facet impinged upon by said selected ray during propagation through said gemstone;

repeating said steps of selecting a model light ray, providing a path set, propagating said selected ray, and creating a subsequent ordered path set;

determining at least one optical property of said gemstone based on an analysis of said selected rays.

2. The method of claim 1 further comprising the step of determining an alteration to said gemstone that would improve an optical property of said gemstone.

3. The method of claim 1 wherein, during said step of repeating, said step of providing a path set provides said subsequent ordered path set created during the immediately prior iteration of said repeated steps.

4. A computer program product comprising a set of instructions residing on computer-readable medium and capable of being followed by a computer processor, said instructions comprising:

instruction means for providing a pattern of successive contact points on the surface of a model gemstone, said pattern being such that the connection of successive contact points with a line generates an expanding rotational path;

instruction means for selecting a model light ray, said ray having an initial location and direction such that said ray impinges upon a contact point comprised by said pattern;

instruction means for providing a path set comprising an ordered sequence of at least one facet identifier, said path set sequence corresponding in whole or in part to a sequence of facets impinged upon by a ray propagated through said gemstone prior to propagation of said selected ray through said gemstone;

instruction means for propagating said selected ray through said gemstone utilizing said path set as a source for identifying a predicted facet of impingement for said selected ray;

instruction means for creating a subsequent ordered path set comprising at least one facet identifier corresponding to a facet impinged upon by said selected ray during propagation through said gemstone;

instruction means for repeating each of the instruction means for selecting a model light ray, the instruction means for providing a path set, the instruction means for propagating said selected ray, and the instruction means for creating a subsequent ordered path set;

instruction means for determining at least one optical property of said gemstone based on an analysis of said selected rays.

5. A ray tracing method useful in evaluating an optical property of a gemstone, said method comprising the steps of:

providing a model gemstone comprising a plurality of facets, each facet being identified by a facet identifier;

selecting a model light ray for propagation through said gemstone;

providing a path set comprising an ordered sequence of at least one facet identifier, said path set sequence corresponding in whole or in part to a sequence of facets impinged upon by a ray propagated through said gemstone prior to propagation of said selected ray through said gemstone;

propagating said selected ray through said gemstone utilizing said path set as a source for identifying a predicted facet of impingement for said selected ray;

creating a subsequent ordered path set comprising at least one facet identifier corresponding to a facet impinged upon by said selected ray during propagation thereof through said gemstone;

repeating said steps of selecting a model light ray, providing a path set, propagating said selected ray, and creating a subsequent ordered path set;

determining at least one optical property of said gemstone based on an analysis of said selected rays.

6. The method of claim 5 wherein, in said step of creating a subsequent ordered path set, said correspondence between said at least one facet identifier and a facet impinged upon by said selected ray is such that the position of said facet identifier within said subsequent ordered path set is the same as the position of the facet identified by said facet identifier within the sequence of facets impinged by said selected ray during propagation thereof through said gemstone.

7. The method of claim 5 wherein said selected ray is modeled as comprising light having either only one or more than one frequency within the visible light spectrum.

8. The method of claim 5 wherein said propagation of said selected ray is performed either in quasi-parallel fashion or in series with said propagation of said ray previously propagated.

9. The method of claim 5 wherein said subsequent ordered path set comprises facet identifiers for each facet impinged upon by said selected ray during propagation thereof.

10. The method of claim 5 wherein said path set comprises facet identifiers for each facet impinged upon by said ray propagated through said gemstone prior to propagation of said selected ray through said gemstone.

11. The method of claim 5 further comprising the step of providing a ray set consisting of rays to be propagated during an evaluation of said gemstone; wherein said step of selecting is limited to selecting a ray from said ray set; and wherein said step of repeating is performed until each of said rays in said ray set has been propagated.

12. The method of claim 5 wherein during said step of propagating, said predicted facet of impingement is identified by a facet identifier occupying a position within said path set that is the same as the position within said subsequent ordered path set that will be occupied by a facet identifier identifying a facet impinged by said selected ray for which said predicted facet of impingement is used as a prediction.

13. The method of claim 5 further comprising the step of determining whether said selected ray impinges upon said predicted facet of impingement.

14. The method of claim 13 further comprising the steps of:
choosing one or more next predicted facets of impingement, said next predicted facets of impingement being spatially adjacent to said predicted facet of impingement;
resolving whether said selected ray impinges upon any of said one or more next predicted facets of impingement; and
repeating said steps of choosing and resolving, unless and until a facet of impingement has been determined;
wherein said steps of choosing, resolving, and repeating said steps of choosing and resolving are performed only if said selected ray is determined not to impinge upon said predicted facet of impingement.

15. The method of claim 5 wherein said selected ray has an initial location and direction such that said ray initially impinges upon a contact point comprised by a pattern of successive contact points on the surface of said gemstone, said pattern being such that the connection of successive contact points with a line generates an expanding rotational path.

16. A ray tracing method useful in evaluating an optical property of a gemstone, said method comprising the steps of:
providing a pattern of successive contact points on the surface of a gemstone, said pattern being such that the connection of successive contact points with a line generates an expanding rotational path;
selecting a set of model light rays, each ray in said ray set having an initial location and direction such that each ray in said ray set initially impinges upon a contact point comprised by said pattern of contact points;
ordering said rays within said set of rays into a sequence such that a second of any two successive rays in said sequence impinges upon a contact point with said pattern that is either the same as or successive to a contact point within said pattern impinged upon by a first of said any two successive rays;
propagating rays in said ray set through said gemstone;
determining at least one optical property of said gemstone based on an analysis of said propagated rays.

17. The method of claim 16 wherein said path defining said pattern generally fits to the shape of a spiral, a distorted spiral, a square spiral, a rectangular spiral, a triangular spiral, an oval spiral, a pear spiral, a heart spiral, or the shape of the projection onto said gemstone of a spiral, a distorted spiral, a square spiral, a rectangular spiral, a triangular spiral, an oval spiral, a pear spiral, or a heart spiral.

18. The method of claim 17 wherein said path has a base shape corresponding to the shape of said gemstone at the largest horizontal circumference thereof.

19. The method of claim 16 wherein said contact points defining said pattern are generally evenly distributed about at least a portion of the surface area of said gemstone.

20. The method of claim 19 wherein said portion of said surface of said gemstone is one of the whole surface, a segment, a table, a bezel, a crown, a girdle, a pavilion, a culet, a facet, or a projection onto the surface of said gemstone of a geometric shape.

21. The method of claim 16 wherein said step of propagating rays is performed using said sequence as a basis for an order of propagation; and wherein said step of propagating rays is performed either in quasi-parallel fashion or in series fashion.

22. The method of claim 16 wherein said step of propagating is performed based on a predicted path of propagation for each ray so propagated.

* * * * *